Feb. 7, 1961           E. H. BELK           2,970,860
AUTOMOBILE REPLACEMENT CARPET
Filed Oct. 19, 1959
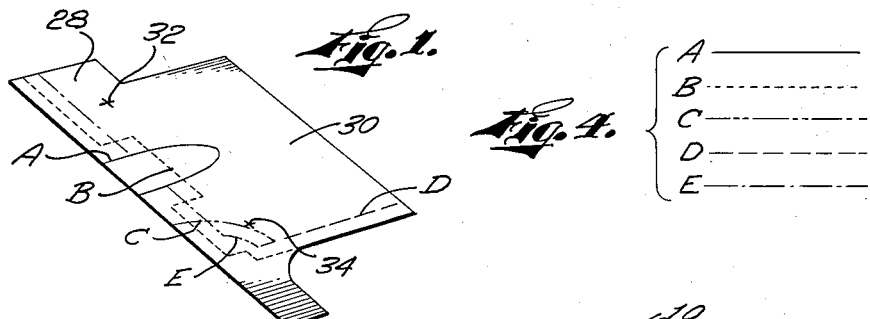
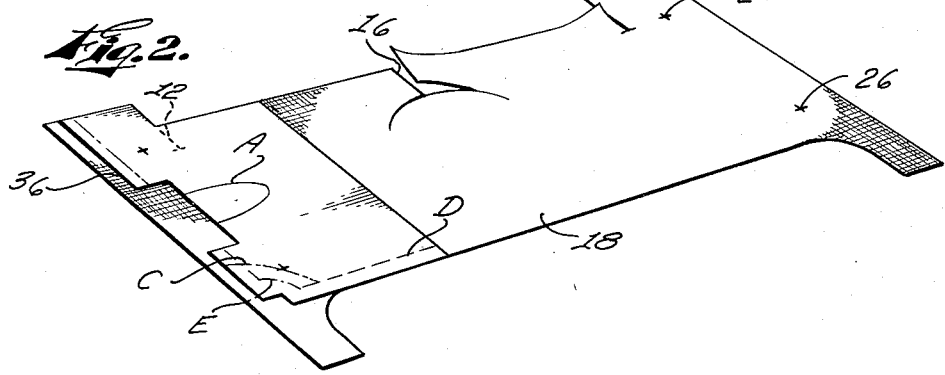
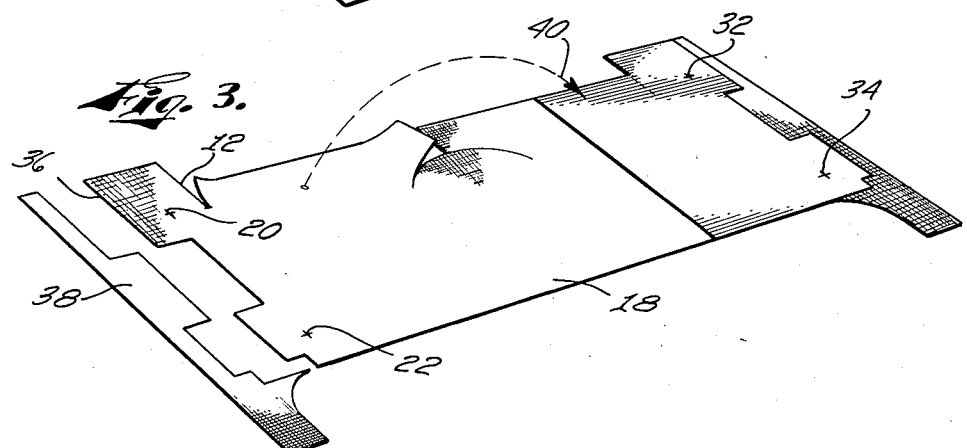
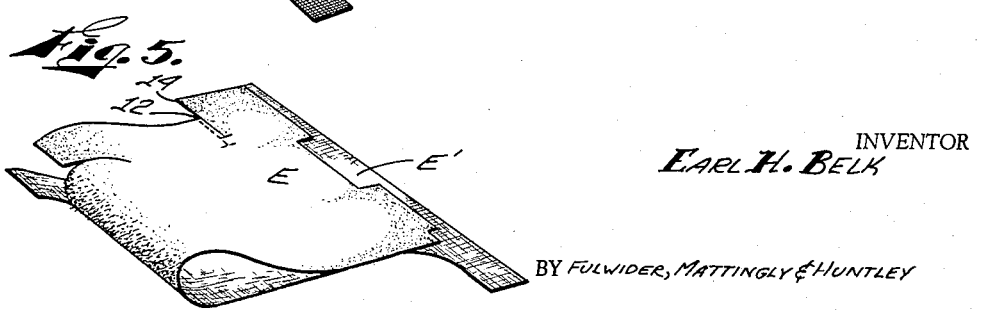
INVENTOR
EARL H. BELK
BY FULWIDER, MATTINGLY & HUNTLEY
ATTORNEYS United States Patent Office 2,970,860
Patented Feb. 7, 1961

2,970,860

AUTOMOBILE REPLACEMENT CARPET

Earl H. Belk, Long Beach, Calif., assignor to Kustom-Fit Mfg. Co., Long Beach, Calif., a corporation of California Filed Oct. 19, 1959, Ser. No. 847,374

1 Claim. (Cl. 296—1)

The present invention relates generally to automobile replacement carpets or floor mats and particularly to altering means therefor that permits a single pre-cut carpet to be adapted to various body styles.

It is well known that the front and rear automobile carpets or floor mats provided as original equipment in new automobiles are subject to damage both from wear and from inadvertent causes. Accordingly, there have been heretofore proposed replacement carpets for those supplied as original equipment. These replacment carpets have been packaged for use in a particular make and body style of automobile and stocked both by automobile accessory dealers and shops providing replacement service. Such replacement carpets are generally pre-cut to the proper size for the particular automobile make and body style required.

While in years past it has been possible to stock a single replacement carpet that would fit several year and body types of a particular make of automobile, in recent years each make of automobile has required several types of replacement carpets for its various body styles. This necessitates that the automotive accessory dealers and service shops stock an increasingly large inventory of such replacement carpets. This has also necessitated an increased unit cost for the replacement carpet, resulting from the necessity of providing separate tooling for fabricating the large number of individual patterns of replacement carpets.

It is a major object of the present invention to provide a single pre-cut carpet or floor mat blank and altering means therefor which may be utilized with several automotive body styles to thereby overcome the aforementioned disadvantages.

Another object of the invention is to provide a single carpet blank and coded template therefor whereby the blank may be altered to fit various body styles.

Yet another object of the invention is to provide a coded template for altering pre-cut carpet blanks to fit various body styles.

Still another object of the invention is to provide a coded template that may be located exactly on a pre-cut carpet blank to permit alteration thereof to fit a desired body style.

A further object of the invention is to provide a coded template that may be definitely located for exact alteration of a carpet blank that has been initially pre-cut to conform generally to various body styles.

These and other objects and advantages of the present invention will become more apparent from the following detailed description, when taken in conjunction with the appended drawings wherein:

Figure 1 is a perspective view of a coded template adapted for use with a pre-cut carpeting blank in forming a replacement carpet or floor mat in accordance with the present invention;

Figure 2 is a perspective view of said template properly located on a pre-cut carpeting blank prior to alteration of the latter;

Figure 3 is a perspective view of said blank altered on one end and with said coded template reversely located on the other end;

Figure 4 shows a code arrangement utilized with said blank and template; and

Figure 5 shows a modified manner of forming a completed replacement carpeting in accordance with the present invention.

Referring to the drawings and particularly Figure 2 thereof, there is shown a carpeting blank 10. This blank 10 may consist of a sheet of conventional carpeting material, such as a natural or synthetic textile or rubber. The blank 10 is pre-cut initially to conform in outline generally to the floors of various automotive body styles. The blank 10 should be at least as wide as the widest floor of such body styles. A rear carpet or floor mat has been disclosed in the drawings for illustrative purposes but the present invention also contemplates use as an altering means for pre-cut front carpets or floor mats. The blank 10 has standard dual seat tracks 12 and 14 pre-cut therein at its front portion. The blank 10 may be pre-cut in conventional manner at 16 to insure proper fit over the transmission housing.

In Figures 2 and 3, the blank 10 has been inverted so that its front side faces downwardly, and its reverse side 18 is visible to the viewer. The reverse side of the blank 10 has dual template locator indicia 20 and 22 marked on one end E thereof. A similar set of template locator indicia 24 and 26 is marked on the other end E' of the reversely positioned blank 10. Other types of locator indicia or marking may be used, as for example, perforations. These dual template locator indicia insure exact positioning thereon of an altering template 28 shown in Figures 1, 2 and 3.

The template 28 is preferably made of paper, but other materials are suitable. Paper, however, permits maximum economy of manufacture. The paper template 28 conforms initially to the end portions of the blank 10. For this reason the template 28 need only cover one end portion of the blank 10 for proper alteration thereof. It is reversible to the opposite end portion as will later be described. The paper template 28 has an unmarked portion 30, upon which instructions as to use are preferably printed. A pair of complementary locator indicia 32 and 34 are marked on the template in a manner to coincide exactly with the locator indicia 20, 22, 24 and 26 of the blank 10 when the template is placed thereon in the manner shown in Figures 2 and 3.

The paper template 28 bears a plurality of cutting lines designated A, B, C, D and E. Each set of cutting lines indicates portions of the blank 10 to be cut out whereby the blank will fit a particular automobile body style.

In actual practice set A of these cutting lines could designate a two-door hard top body style. Line B could designate a two-door sedan. Line C could designate a four-door sedan. Line D could designate a convertible, and line E could designate a four-door hard top. These lines A through E may each be imprinted on the template 28 in two or more different colors. Alternately, each line may be of a similar color but with its characteristics different from the other lines. Thus, it will be observed that line A is solid, line B is formed with small dots, lines C and E are formed of two different combinations of dots and dashes, while line D is formed of a series of short dashes. In any event, it is only necessary that the various sets of lines be capable of clear differentiation whereby they will indicate to the user which particular body style they represent.

Assuming that the proper body style has been determined, the user then cuts the template 28 along the designated cutting line. In the example shown in the drawings cutting line B is utilized. Referring now to Figure 2, the template 28, cut to proper body style, is shown imposed in altering position on one end of the reverse side 18 of the blank 10, with the locator indicia 32 and 34 of the blank coinciding exactly with the indicia 20 and 22 of the blank. The blank 10 is then altered to desired body style by cutting along the edge 36 of the properly located template 28. The cut-away portion 38 of the blank 10 is shown separated from the main body thereof in Figure 3, with the altered end of the blank assuming proper body style conforming shape. The template 28 is then swung reversely in the direction of the arrow 40 to the other end of the blank 10, as clearly shown in Figure 3. The template 28 is again properly positioned by coinciding the locator indicia 32 and 34 with indicia 24 and 26, respectively. The opposite end of the blank 10 is then altered in exactly the same manner as heretofore described to provide a completed floor covering properly fitting the desired body style.

In Figure 5, a modified method of altering the opposite end of the blank 10 is shown. In this case, after one end E of the blank 10 has been cut-away by using the template 28, the altered end E is doubled over on the uncut end E' of the blank, with the seat tracks 12 and 14 coinciding. This method locates the altered blank end E in exact position for the operator to sever the blank's opposite end proper cutting line. A completed carpet is thus produced in a slightly different manner.

After the procedures before described have been completed, the altered carpet 10 will be ready for installation in the automobile. If desired the user may bind the edges of the cut-out line after the altering operation. Such binding, however, is optional.

While there has been shown and described hereinabove what is presently considered to be a preferred embodiment of the present invention, it will be apparent that various modifications and changes may be made thereto without departing from the spirit of the invention or the scope of the following claim.

I claim:

Automobile replacement carpet apparatus, comprising: a carpet blank conforming in outline generally to the floors of various automobile body styles, said blank being at least as wide as the widest of such floors; first locator indicia on one end portion of said blank; second locator indicia on the opposite end portion of said blank; a template temporarily disposable upon either of said end portions, said template bearing a plurality of sets of cutting lines with each set of cutting lines indicating areas of said end portions to be cut out whereby the resulting floor mat will fit a particular automobile body style; and first and second complementary locator indicia on said template for successive coincidence with said first and second locator indicia whereby said template may be successively located on opposite ends of said blank and said end portions of said blank cut-out along said cutting lines.

References Cited in the file of this patent

UNITED STATES PATENTS

| | | |
|---|---|---|
| 1,717,983 | Laub | June 18, 1929 |
| 2,070,410 | Pilla | Feb. 9, 1937 |